C. WHITE.
PISTON AND PISTON ROD CONNECTION.
APPLICATION FILED OCT. 15, 1915.

1,195,542.

Patented Aug. 22, 1916.

Inventor:
Charles White,
by Spear, Middleton, Donaldson & Spear
Attys.

UNITED STATES PATENT OFFICE.

CHARLES WHITE, OF BALTIMORE, MARYLAND.

PISTON AND PISTON-ROD CONNECTION.

1,195,542. Specification of Letters Patent. Patented Aug. 22, 1916.

Application filed October 15, 1915. Serial No. 56,108.

*To all whom it may concern:*

Be it known that I, CHARLES WHITE, a citizen of the United States, residing at Baltimore, Maryland, have invented certain new and useful Improvements in Pistons and Piston-Rod Connections, of which the following is a specification.

The invention consists in the features and combination and arrangement of parts hereinafter described and particularly pointed out in the claims.

Figure 1:
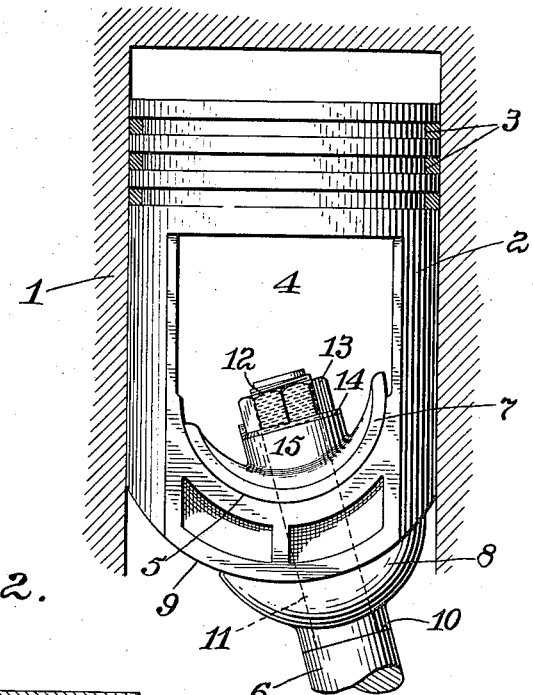
Figure 2:
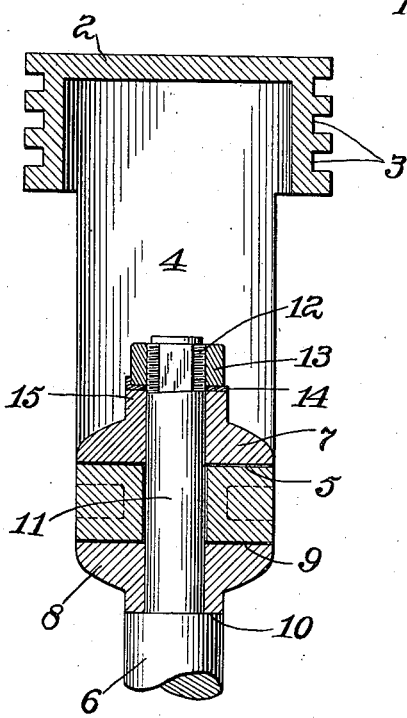
Figure 3:
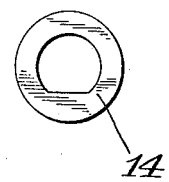

In the drawing: Figure 1 is a side elevation of a piston and piston rod connection built according to my invention, a portion of the cylinder being shown diagrammatically. Fig. 2 is a section through the piston and connection a quarter turn from that shown in Fig. 1. Fig. 3 is a view of a lock washer.

In these drawings, 1 indicates the cylinder diagrammatically and 2 the piston which is provided with the usual grooves for receiving the packing rings at 3, the lower part of the piston is reduced in width as shown in Fig. 2 and through this portion an opening is formed as at 4, the lower wall of this opening being curved on the arc of a circle, as at 5 struck from a point at the axial center line of the piston where the ordinary wrist pin would be located, if such pin were used. In my construction however, no wrist pin of any character is employed but the connection between the piston and the piston rod 6 includes a sliding shoe or block 7 adapted to traverse the track or curved way 5 and a second shoe or block 8 curved to fit the curved lower end of the piston as shown at 9, this curve being struck from the same center as the curve or track 5. The piston rod is shouldered at 10 to receive the block 8 and the reduced portion 11 of the piston rod passes through a slot at the lower end of the piston, this reduced portion passing through the blocks or shoes 7 and 8 and having a threaded end 12 receiving a nut 13, bearing on a lock washer 14, which rests on the boss 15 formed as a part of the sliding member or block 7. The block 7 together with the nut lies within the opening in the piston and it will be seen that access may be readily had to this nut for its adjustment on the threaded end of the piston rod to properly adjust the sliding block or to take up wear of the blocks 7 and 8 and the tracks or ways upon which they move.

One advantage of the present construction, aside from the simplicity thereof, is that the opening through the piston can be readily reamed out and then by placing the piston upon a mandrel passing through this opening the outer curve 9 can be quickly and accurately made, this being all outside work. Further the shifting blocks 7 and 8 can be made of considerable extent, the only limitation being that the block 8 will be of a length such as will avoid contact thereof with the wall of the cylinder.

The lock washer 14 may be turned up at any point to engage the nut and it may have a non-circular opening as shown in Fig. 3 so as to fit the threaded end of the piston rod having a flat side.

What I claim is:—

1. In combination with a piston having an opening therethrough with a curved track or way and with an exterior track or way concentric with that first mentioned, a piston rod passing through a slot in the piston and a shifting wrist connection consisting of a block within the opening of the piston bearing upon the inner curved way and a block bearing upon the outer curved way and means for connecting said blocks with the piston rod, substantially as described.

2. In combination with a piston and piston rod, said piston having an opening therethrough, a shifting wrist block and means to connect the piston rod and shifting wrist block, said means being exposed at the opening through the piston for adjustment, substantially as described.

3. In combination with a piston having an opening therethrough and having an inner curved way or track and an outer curved way or track, a shifting wrist block on each of the curved ways, the piston rod carrying said blocks and passing through a slot at the curved portion of the piston and a nut threaded on the end of the piston rod, said nut by its adjustment taking up the wear of both the inner and outer wrist blocks, substantially as described.

4. In combination with a piston, a piston rod, an inner and an outer block carried by the piston rod fitted to curved tracks or ways on the said piston, said piston rod being shouldered to position the outer block and a nut at the extreme end of the piston rod to bear on the inner shifting block, whereby the blocks may be adjusted in relation to the piston.

5. In combination with a piston having an opening therethrough with one wall of said opening curved on the arc of a circle to provide a way or track, the extreme end of said piston being formed on an arc concentric with that first mentioned, a piston rod and connecting means carried by the piston rod and moving on the inner and outer tracks, substantially as described.

CHARLES WHITE.

Witnesses:
 EILEEN A. HEMSLEY,
 RICHARD B. PUE.